(12) United States Patent
Rynearson

(10) Patent No.: US 10,722,073 B2
(45) Date of Patent: Jul. 28, 2020

(54) PORTABLE GRILLING ASSEMBLY

(71) Applicant: Melvin Rynearson, W. Palm Beach, FL (US)

(72) Inventor: Melvin Rynearson, W. Palm Beach, FL (US)

(*) Notice: Subject to any disclaimer, the term of this patent is extended or adjusted under 35 U.S.C. 154(b) by 122 days.

(21) Appl. No.: 16/055,803

(22) Filed: Aug. 6, 2018

(65) Prior Publication Data

US 2020/0037817 A1    Feb. 6, 2020

(51) Int. Cl.
    *A47J 37/07*     (2006.01)

(52) U.S. Cl.
    CPC ....... *A47J 37/0704* (2013.01); *A47J 37/0731* (2013.01); *A47J 37/0768* (2013.01); *A47J 37/0786* (2013.01); *A47J 2037/0795* (2013.01)

(58) Field of Classification Search
    CPC .................................................. A47J 37/0704
    USPC ..................................... 126/25 R, 30; 99/450
    See application file for complete search history.

(56) References Cited

U.S. PATENT DOCUMENTS

| | | | |
|---|---|---|---|
| 2,998,001 A * | 8/1961 | Lofgren | A47J 37/0772 126/25 A |
| 3,162,113 A * | 12/1964 | Tallaksen | A47J 37/0772 99/446 |
| 4,437,450 A * | 3/1984 | Connelly | A47J 37/0772 126/30 |
| 4,979,490 A | 12/1990 | Nudo et al. | |
| 5,307,797 A | 5/1994 | Kleefeld | |
| 5,819,718 A | 10/1998 | Leiser | |
| 5,848,584 A | 12/1998 | Brog | |
| 6,070,571 A | 6/2000 | Bradbury | |
| 6,584,967 B1 | 7/2003 | Paument | |
| 6,640,797 B1 * | 11/2003 | Magers | A47J 33/00 126/30 |
| D577,946 S | 10/2008 | Carroll | |
| 2008/0271725 A1 * | 11/2008 | Parmelee | F24B 1/205 126/30 |
| 2014/0360483 A1 * | 12/2014 | Mattix | A47J 33/00 126/30 |
| 2015/0285507 A1 * | 10/2015 | Troyer, Jr. | F24B 1/182 126/30 |

FOREIGN PATENT DOCUMENTS

WO    WO2006083705    8/2006

* cited by examiner

*Primary Examiner* — Avinash A Savani

(57) ABSTRACT

A portable grilling assembly for cooking outdoors includes a stake that can be driven into the ground. The stake is comprised of a plurality of connectable sections such that the stake has an adjustable length. A grill is provided and the grill is removably coupled to the stake. The grill is slidably positioned on the stake such that the grill is positionable at a selected point along the stake. In this way the grill can be spaced a selected distance from the ground. A basket is removably coupled to the stake and the basket is slidably positioned on the stake such that the basket is positionable at a selected point along the stake. Moreover, the basket is comprised of a fire resistant material to contain a heat source for cooking on the grill.

5 Claims, 5 Drawing Sheets

PORTABLE GRILLING ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to grilling devices and more particularly pertains to a new grilling device for PURPOSE.

BRIEF SUMMARY OF THE INVENTION

An embodiment of the disclosure meets the needs presented above by generally comprising a stake that can be driven into the ground. The stake is comprised of a plurality of connectable sections such that the stake has an adjustable length. A grill is provided and the grill is removably coupled to the stake. The grill is slidably positioned on the stake such that the grill is positionable at a selected point along the stake. In this way the grill can be spaced a selected distance from the ground. A basket is removably coupled to the stake and the basket is slidably positioned on the stake such that the basket is positionable at a selected point along the stake. Moreover, the basket is comprised of a fire resistant material to contain a heat source for cooking on the grill.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
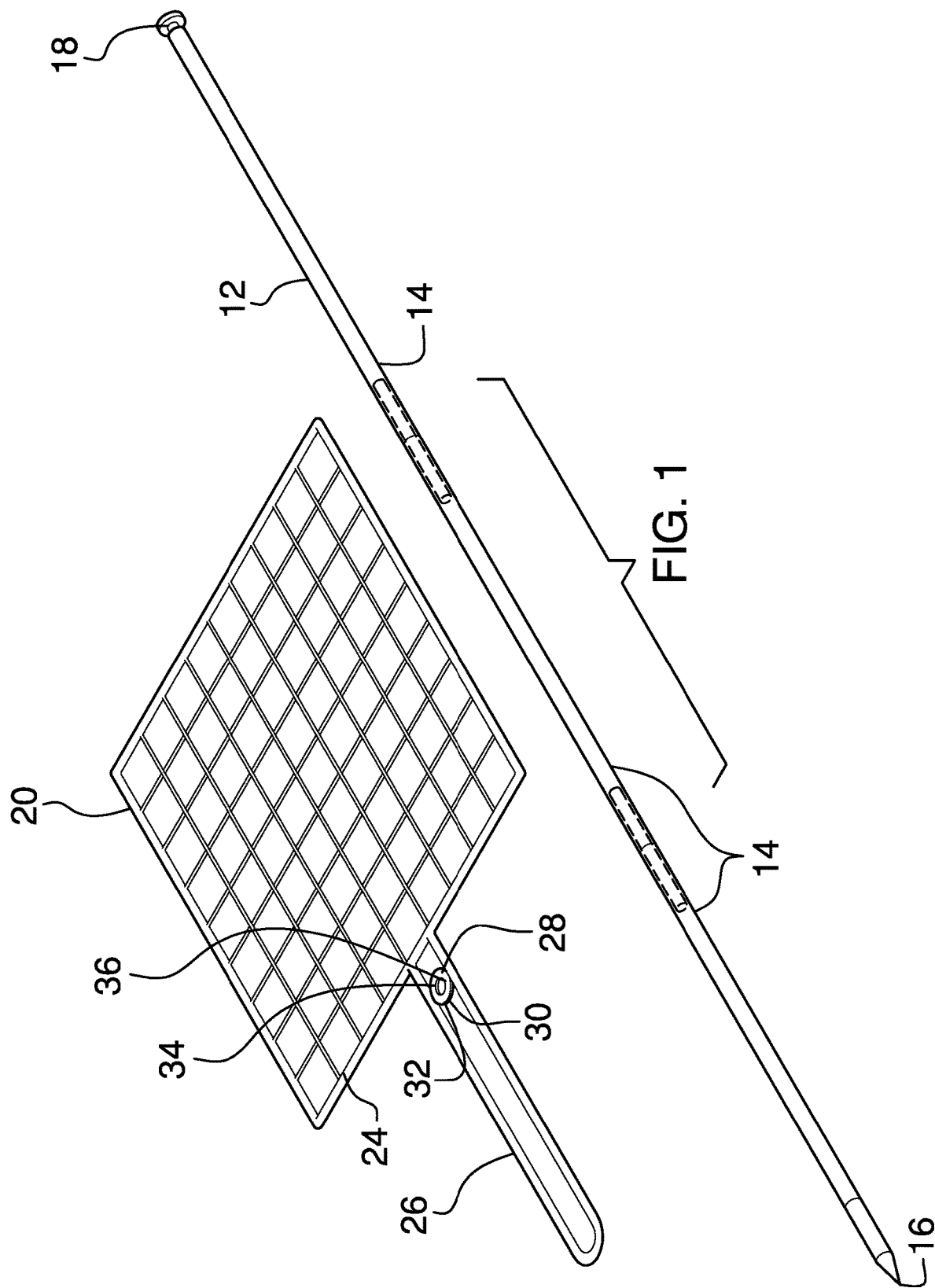
FIG. 1 is a phantom perspective view of a portable grilling assembly according to an embodiment of the disclosure.
Figure 2:
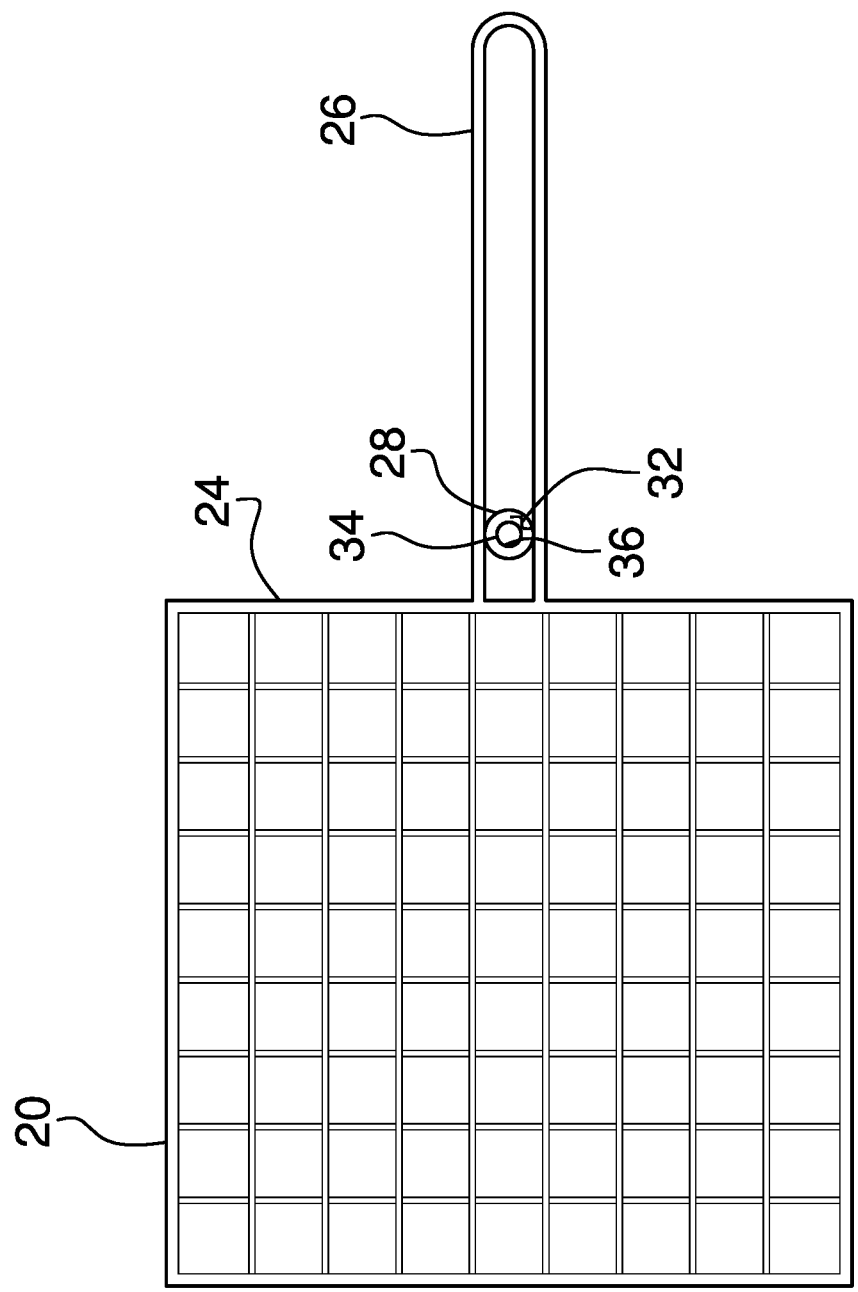
FIG. 2 is a top view of a grill of an embodiment of the disclosure.
Figure 3:
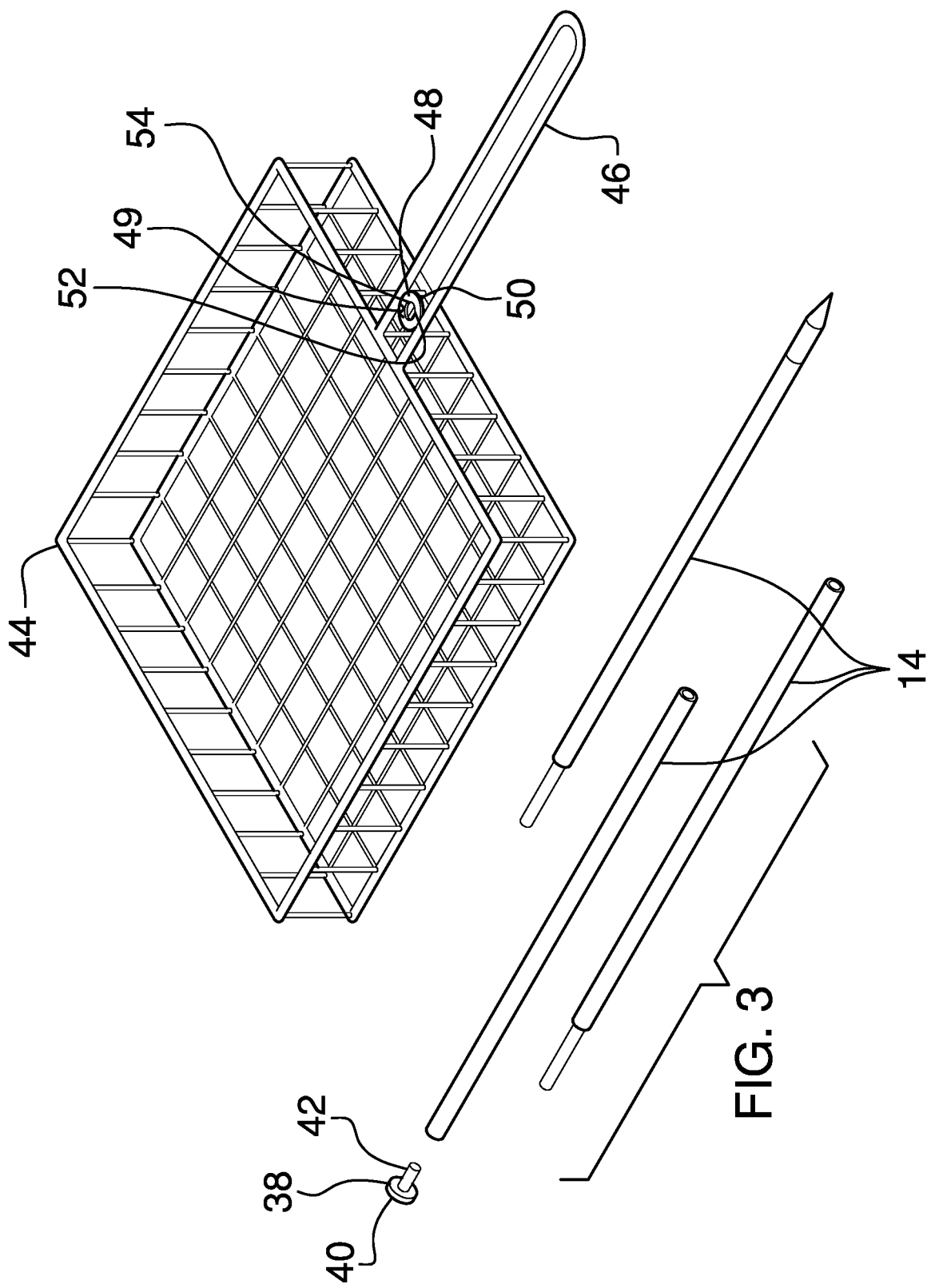
FIG. 3 is an exploded perspective view of an embodiment of the disclosure.
Figure 4:
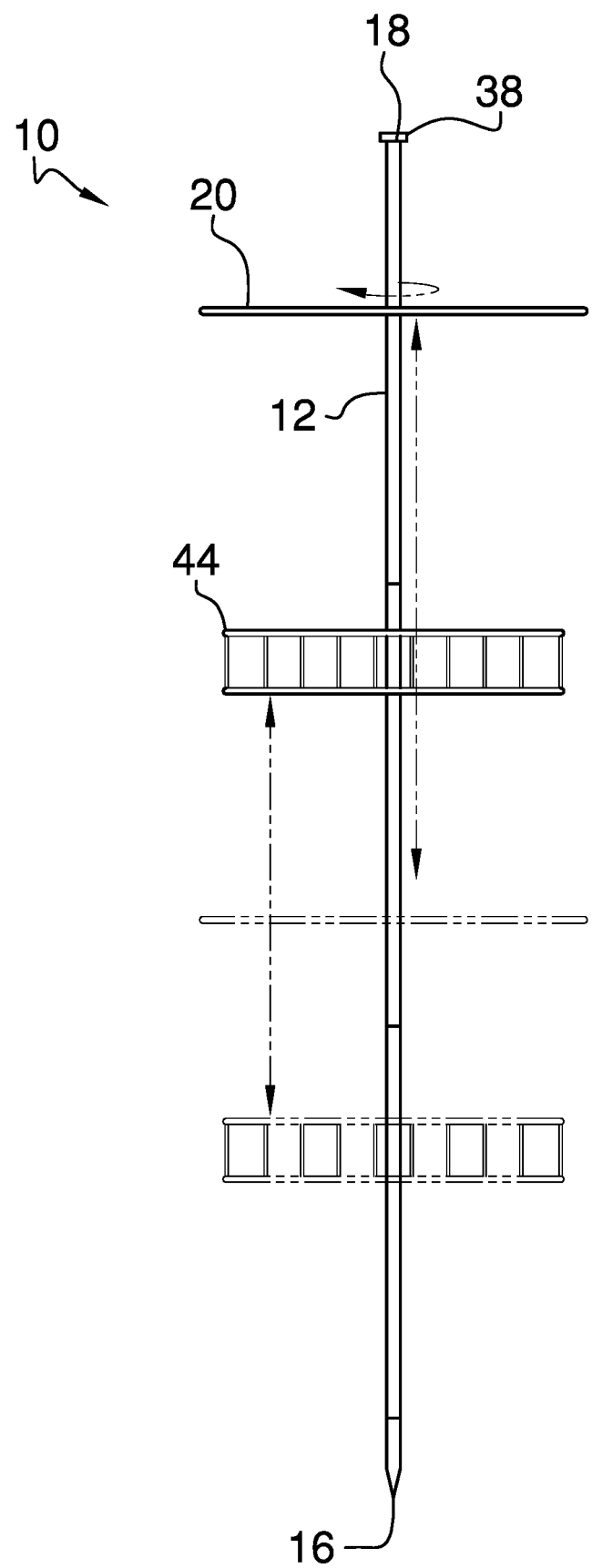
FIG. 4 is a front view of an embodiment of the disclosure.
Figure 5:
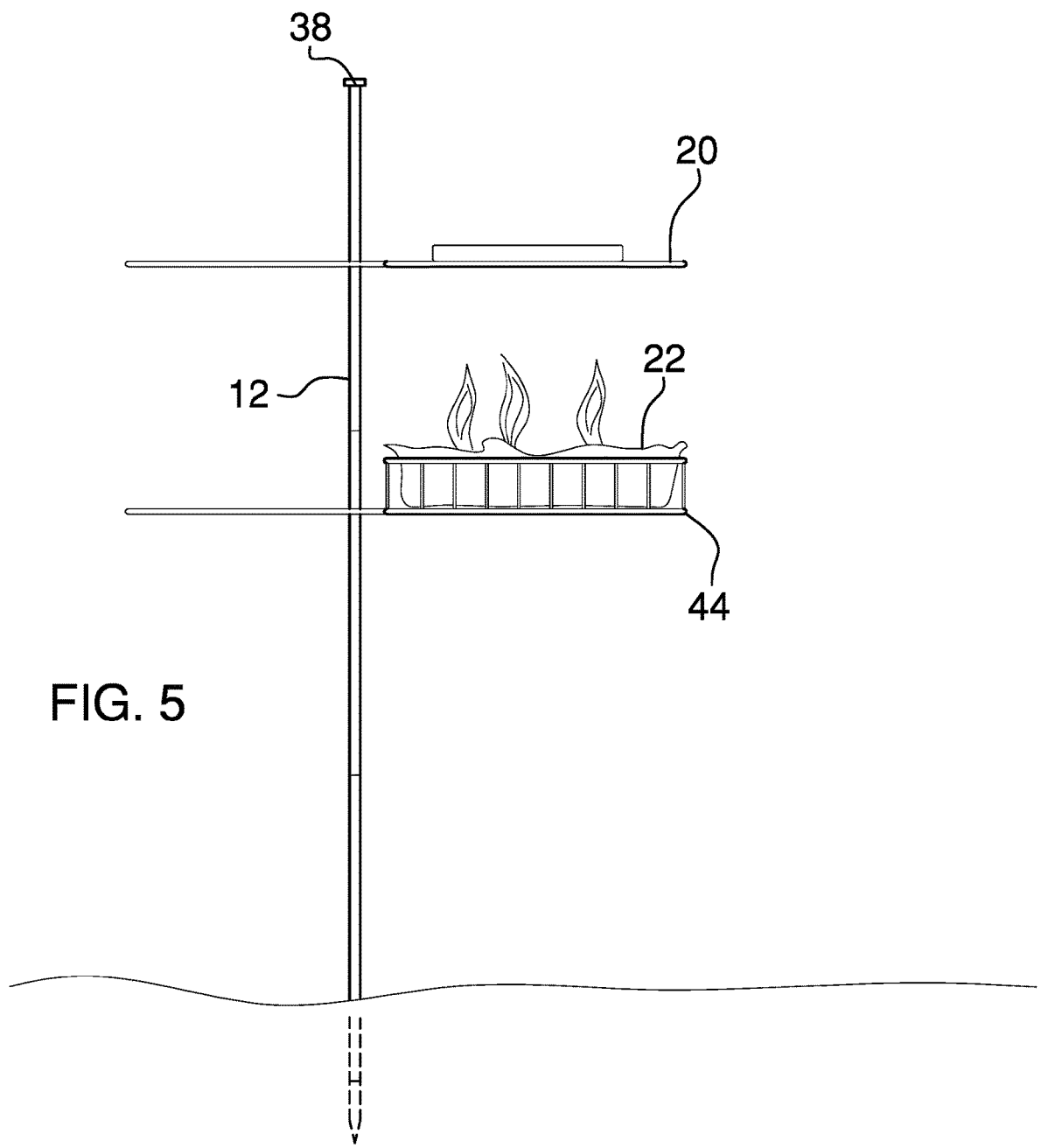
FIG. 5 is a perspective in-use view of an embodiment of the disclosure.

With reference now to the drawings, and in particular to FIGS. 1 through 5 thereof, a new grilling device embodying the principles and concepts of an embodiment of the disclosure and generally designated by the reference numeral 10 will be described.

As best illustrated in FIGS. 1 through 5, the portable grilling assembly 10 generally comprises a stake 12 for piercing the ground. The stake 12 is comprised of a plurality of connectable sections 14 such that the stake 12 has an adjustable length. The stake 12 has a first end 16 and a second end 18, and the first end 16 tapers to a point for piercing the ground. Each of the connectable sections 14 insertably receives each other for connecting the connectable sections 14 together. Each of the connectable sections 14 may have a length of approximately 40.0 cm and each of the connectable sections 14 may comprise a conduit and a sleeve for inserting into adjacent pairs of connectable sections 14.

A grill 20 is provided and the grill 20 is removably coupled to the stake 12. The grill 20 is slidably positioned on the stake 12 such that the grill 20 is positionable at a selected point along the stake 12. In this way the grill 20 may be spaced a selected distance from the ground having the grill 20 lying on a horizontal plane. The grill 20 is comprised of a fire resistant material such as steel or the like and the grill 20 is aligned with a heat source 22 for cooking food items on the grill 20. The heat source 22 may be a wood fire, burning charcoal and any other heat source commonly employed outdoors for cooking. The grill 20 has a perimeter edge 24 and a handle 26 extends outwardly from the perimeter edge.

A coupler 28 is coupled to the grill 20 and the coupler 28 slidably engages the stake 12 to slidably retain the grill 20 on the stake 12. The coupler 28 has a top surface 30 and a bottom surface 32, and the coupler 28 has an aperture 34 extending through the top 30 and bottom 32 surfaces. The aperture 34 insertably receives the second end 18 of the stake 12. Moreover, the aperture 34 has a bounding edge 36 and the bounding edge 36 frictionally engages the stake 12 when the handle 26 supports a weight of the grill 20. In this way the coupler 28 retains the grill 20 at the selected point along the stake 12.

A stop 38 is provided and the stop 38 is removably inserted into the second end 18 of the stake 12. The stop 38 inhibits the coupler 28 from sliding off of the stake 12. The stop 38 may include a cap 40 and a stem 42, and the second end 18 of the stake 12 may insertably receive the stem 42. The cap 40 extends outwardly beyond an outer surface of the stake 12 when the stem 42 is positioned in the second end 18 of the stake 12.

A basket 44 is provided and the basket 44 is removably coupled to the stake 12. The basket 44 is slidably positioned on the stake 12 and the basket 44 is positionable at a selected point along the stake 12. The basket 44 is comprised of a fire resistant material, such as steel or the like, and the heat source 22 may be positioned in the basket 44 for cooking. The basket 44 has grip 46 extending outwardly therefrom and a retainer 48 is coupled to the grip 46. The retainer 48 has an upper surface 49 and a lower surface 50. The retainer 48 has an opening 52 extending through the upper 48 and lower 50 surfaces. The opening 52 insertably receives the second end 18 of the stake 12 having the basket 44 being positioned below the grill 20 on the stake 12. The opening 52 has a bounding edge 54 and the bounding edge 54 of the opening 52 frictionally engages the stake 12 when the grip 46 supports a weight of the basket 44. In this way the retainer 48 retains the basket 44 at the selected point along the stake 12 having the basket 48 being horizontally oriented.

In use, a selected number of the connectable sections 14 are connected together and the first end 16 of the stake 12 is driven into the ground having the stake 12 being vertically oriented. The coupler 28 is slid onto the stake 12 and the grill 20 is positioned at a selected point on the stake 12. The coupler 28 frictionally engages the stake 12 when the grill 20 is released thereby retaining the grill 20 at the selected point. Additionally, the grill 20 is rotated on the stake 12 such that the grill 20 is positioned above the heat source 22 for cooking on the grill 20. In the event that no heat source 22 is available, the basket 44 is positioned on the stake 12 before the grill 20 and the heat source 22 is positioned in the basket 44. The grill 20 is positioned on the stake 12 and located above the basket 44 for cooking with the heat source 22 in the basket 44. In this way the grill 20 and the basket 44 facilitate cooking outdoors when a charcoal or gas grill, fire pit or other heat source is not available for cooking.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable grilling assembly being configured to pierce the ground for orienting in a vertical fashion over a heat source for cooking, said assembly comprising:

a stake being configured to pierce the ground, said stake being comprised of a plurality of connectable sections such that said stake has an adjustable length, said stake having a first end and a second end;

a grill being removably coupled to said stake, said grill being slidably positioned on said stake such that said grill is positionable at a selected point along said stake wherein said grill is configured to be spaced a selected distance from the ground;

a basket being removably coupled to said stake, said basket being slidably positioned on said stake such that said basket is positionable at a selected point along said stake, said basket being comprised of a fire resistant material wherein said basket is configured to contain a heat source for cooking, said basket having a grip extending outwardly therefrom, said grip extending perpendicularly from a peripheral edge of said basket, said basket being symmetrical extending laterally in opposite directions away from said grip; and a retainer being coupled to said grip, said retainer having an upper surface and a lower surface, said retainer being aligned with a central longitudinal axis of said grip.

2. The assembly according to claim 1, wherein:

said grill is comprised of a fire resistant material, said grill being alignable over said basket for cooking food items on said grill, said grill having a perimeter edge and a handle extending outwardly from said perimeter edge; and a coupler being coupled to said grill, said coupler slidably engaging said stake to slidably retain said grill on said stake, said coupler having a top surface and a bottom surface; and said coupler having an aperture extending through said top and bottom surfaces for insertably receiving said second end of said stake, said aperture having a bounding edge, said bounding edge frictionally engaging said stake when said handle supports a weight of said grill for retaining said grill at said selected point along said stake.

3. The assembly according to claim 2, further comprising:

said second end being open; and a stop being removably inserted into said second end of said stake to inhibit said coupler from sliding off of said stake, said stop including a cap and a stem, said second end of said stake insertably receiving said stem having said cap extending outwardly beyond an outer surface of said stake.

4. The assembly according to claim 1, wherein said retainer has an opening extending through said upper and lower surfaces, said opening insertably receiving said second end of said stake having said basket being positioned below said grill on said stake, said opening having a bounding edge, said bounding edge of said opening frictionally engaging said stake when said grip supports a weight of said basket to retain said basket at said selected point along said stake.

5. A portable grilling assembly being configured to pierce the ground for orienting in a vertical fashion over a heat source for cooking, said assembly comprising:

a stake being configured to pierce the ground, said stake being comprised of a plurality of connectable sections such that said stake has an adjustable length, said stake having a first end and a second end, said first end tapering to a point for piercing the ground;

a grill being removably coupled to said stake, said grill being slidably positioned on said stake such that said grill is positionable at a selected point along said stake wherein said grill is configured to be spaced a selected distance from the ground, said grill being comprised of a fire resistant material, said grill being configured to be alignable with a heat source for cooking food items on said grill, said grill having a perimeter edge and a handle extending outwardly from said perimeter edge;

a coupler being coupled to said grill, said coupler slidably engaging said stake to slidably retain said grill on said stake, said coupler having a top surface and a bottom surface, said coupler having an aperture extending through said top and bottom surfaces for insertably receiving said second end of said stake, said aperture having a bounding edge, said bounding edge frictionally engaging said stake when said handle supports a weight of said grill for retaining said grill at said selected point along said stake;

a stop being removably inserted into said second end of said stake to inhibit said coupler from sliding off of said stake, said stop including a cap and a stem, said second end of said stake insertably receiving said stem having said cap extending outwardly beyond an outer surface of said stake; and a basket being removably coupled to said stake, said basket being slidably positioned on said stake such that said basket is positionable at a selected point along said stake, said basket being comprised of a fire resistant material wherein said basket is configured to contain the heat source for cooking, said basket having grip extending outwardly therefrom, said grip extending perpendicularly from a peripheral edge of said basket, said basket being symmetrical extending laterally in opposite directions away from said grip; and a retainer being coupled to said grip, said retainer having an upper surface and a lower surface, said retainer having an opening extending through said upper and lower surfaces, said opening insertably receiving said second end of said stake having said basket being positioned below said grill on said stake, said opening having a bounding edge, said bounding edge of said opening frictionally engaging said stake when said grip supports a weight of said basket to retain said basket at said selected point along said stake, said retainer being aligned with a central longitudinal axis of said grip.

\* \* \* \* \*